(12) United States Patent
Ha et al.

(10) Patent No.: US 10,156,917 B2
(45) Date of Patent: Dec. 18, 2018

(54) INPUT APPARATUS AND CONTROLLING METHOD THEREOF

(71) Applicant: SAMSUNG ELECTRONICS CO., LTD., Suwon-si, Gyeonggi-do (KR)

(72) Inventors: Jung-su Ha, Osan (KR); Jun-hak Lim, Suwon (KR); Bo-ram Namgoong, Seoul (KR); Hyun-ju Lee, Seoul (KR); Jae-chan Koh, Yongin (KR); Jee-su Park, Hwaseong (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 141 days.

(21) Appl. No.: 15/220,548

(22) Filed: Jul. 27, 2016

(65) Prior Publication Data

US 2017/0083117 A1 Mar. 23, 2017

(30) Foreign Application Priority Data

Sep. 17, 2015 (KR) .................. 10-2015-0131406

(51) Int. Cl.
*H04W 12/04* (2009.01)
*G06F 3/038* (2013.01)
(Continued)

(52) U.S. Cl.
CPC ........ *G06F 3/0383* (2013.01); *G06F 3/03545* (2013.01); *G06F 3/0482* (2013.01);
(Continued)

(58) Field of Classification Search
CPC ....... G06F 2203/04807; G06F 3/03545; G06F 3/0383; G06F 3/0482; G06F 3/04842;
(Continued)

(56) References Cited

U.S. PATENT DOCUMENTS 8,595,854 B2 * 11/2013 Wajs .................. G06F 21/10
380/239
2006/0282901 A1 * 12/2006 Li ..................... G06F 21/606
726/26
(Continued)

FOREIGN PATENT DOCUMENTS

EP 2 701 057 A2 2/2014

OTHER PUBLICATIONS

European Search Report dated Feb. 13, 2017 in European Patent Application No. 16 18 5365.

*Primary Examiner* — Tony Davis
(74) *Attorney, Agent, or Firm* — Staas & Halsey LLP

(57) ABSTRACT

An input apparatus capable of receiving an input is provided. The input apparatus includes a communicator configured to communicate with a first user terminal device and a second user terminal device, a processor, in response to a content being selected from the first user terminal device through the input apparatus and a first predetermined event occurring, configured to receive information about identifier information and an encryption key of the first user terminal device from the first user terminal device and, in response to a second predetermined event occurring, configured to transmit the received information about the identifier information and the encryption key of the first user terminal device to the second user terminal device. Accordingly, user convenience will grow due to the reinforcement of security and availability of conveniently transmitting data to an external device without using a separate external device.

20 Claims, 11 Drawing Sheets

(51) Int. Cl.
*G06F 3/0354* (2013.01)
*G06F 3/0482* (2013.01)
*G06F 3/0487* (2013.01)
*H04W 4/80* (2018.01)
*H04L 9/08* (2006.01)
*H04L 29/06* (2006.01)
*G06F 3/0484* (2013.01)

(52) U.S. Cl.
CPC ........ *G06F 3/0487* (2013.01); *G06F 3/04842* (2013.01); *H04L 9/0827* (2013.01); *H04L 63/18* (2013.01); *H04W 4/80* (2018.02); *H04W 12/04* (2013.01); *G06F 2203/04807* (2013.01)

(58) Field of Classification Search
CPC ..... G06F 3/0487; H04L 63/18; H04L 9/0827; H04W 12/04; H04W 4/008; H04W 8/24
USPC ..................................................... 726/26–28
See application file for complete search history.

(56) References Cited

U.S. PATENT DOCUMENTS

| | | |
|---|---|---|
| 2007/0208930 A1 | 9/2007 | Blank et al. |
| 2008/0022299 A1* | 1/2008 | Le Buhan .............. H04N 7/163 725/25 |
| 2013/0322619 A1* | 12/2013 | Yoshimi ............... H04L 9/0816 380/44 |
| 2014/0164632 A1* | 6/2014 | Kim ....................... H04L 67/34 709/227 |
| 2014/0173059 A1 | 6/2014 | Koningstein et al. |
| 2014/0267339 A1 | 9/2014 | Dowd et al. |

\* cited by examiner

400

410

500

510

INPUT APPARATUS AND CONTROLLING METHOD THEREOF

CROSS-REFERENCE TO RELATED APPLICATIONS

This application claims priority benefit under 35 U.S.C. § 119 of Korean Patent Application No. 10-2015-0131406, filed on Sep. 17, 2015 in the Korean Intellectual Property Office, the disclosure of which is incorporated herein by reference in its entirety.

BACKGROUND

1. Field of the Invention

Apparatuses and methods of exemplary embodiments relate to an input apparatus and a controlling method thereof, and more particularly, to an input apparatus capable of transmitting information required to transmit content stored in a user terminal device to an external device and a controlling method thereof.

2. Description of the Related Art

On the strength of advancement of electronic technology, various types of electronic appliances have been developed and supplied. Especially, various display devices such as a TV, a cell phone, a PC, a laptop, PDA, and the like, are used in most homes. Further, having been equipped with an input apparatus such as a pen when using the various types of electronic appliances makes a user to be able to input data more elaborately and comfortably.

Conventionally, a wireless networking method or a wire networking method by using a storing device like a USB is used to transmit data to an external device. Although the wireless networking method may seem to be convenient, it has some problems that it is vulnerable to security, must be connected to a 3G or 4G network, Bluetooth, or a W-Fi network, requires a large sized component for performing networking, and consumes much power.

Further, the wire networking method may have an advantage over security, but it requires a separate storing device, which is one of biggest weaknesses of the method.

Accordingly, a need of reinforcing security and transmitting data to an external device without using a separate external device has come to the forefront.

SUMMARY

An exemplary embodiment addresses at least the above need, and an aspect of the exemplary embodiment is to provide an input apparatus capable of transmitting information required to transmit content selected by an input apparatus to an external device and a controlling method thereof.

The input apparatus capable of receiving an input according to an exemplary embodiment includes a communicator configured to communicate with the first user terminal device and the second user terminal device and a processor, in response to content being selected from the first user terminal device through the input apparatus and the first predetermined event occurring, configured to receive information about identifier information and an encryption key of the first user terminal device from the first user terminal device and, in response to the second predetermined event occurring, configured to transmit the received information about the identifier information and the encryption key of the first user terminal device to the second user terminal device.

The first predetermined event may include an event where a function of transmitting the selected content to an external device is performed in the first user terminal device through the input apparatus, and the second predetermined event may include an event where a function of receiving the selected content from an external device is performed in the second user terminal device through the input apparatus.

The input apparatus capable of receiving an input according to an exemplary embodiment further includes a function key configured to receive a user manipulation, and the processor, in response to the function key being pressed upon the user manipulation while the input apparatus is located within a predetermined range of distance from a screen of the first user terminal device, may transmit a control signal for displaying the first user interface on a screen of the first user terminal device to the first user terminal device and, in response to the function key being pressed upon the user manipulation while the input apparatus is located within a predetermined range of distance from a screen of the second user terminal device, may transmit a control signal for displaying the second user interface on a screen of the second user terminal device to the second user terminal device.

The first user interface may include a menu for transmitting the selected content to an external device in the first user terminal device, and the second user interface may include a menu for receiving the selected content from an external device in the second user terminal device.

The processor, in response to a menu for transmitting the selected content to an external device being selected in the first user interface, may receive information about identifier information and an encryption key of the first user terminal device from the first user terminal device and, in response to a menu for receiving the selected content from the external device being selected in the second user interface, may transmit the received information about the identifier information and the encryption key of the first user terminal device to the second user terminal device.

The input apparatus capable of receiving an input according to an exemplary embodiment further include a storage, and the processor may store information about identifier information and an encryption key of the first user terminal device received from the first user terminal device at the storage.

The encryption key may be used for encrypting identifier information of the second user terminal device.

A system including the input apparatus capable of receiving an input, the first user terminal device, and the second user terminal device, in response to a content being selected from the first user terminal through the input apparatus and the first predetermined event occurring, may receive information about identifier information and an encryption key of the first user terminal device from the first user terminal device and, in response to the second predetermined event occurring, may transmit the received information about the identifier information and the encryption key of the first terminal device to the second user terminal device, and the second user terminal device, based on the received encryption key, may encrypt identifier information of the second user terminal device and transmits the identifier information of the second user terminal device to the first user terminal device, and the first user terminal device may decrypt the received encrypted identifier information of the second user terminal device based on the encryption key and may transmit the selected content to the second user terminal device based on the encrypted identifier information of the second user terminal device.

The first predetermined event may include an event where a function of transmitting the selected content to an external device is performed in the first user terminal device through the input apparatus, and the second predetermined event may include an event where a function of receiving the selected content from an external device is performed in the second user terminal device through the input apparatus.

The first user terminal device, in response to a control signal being received while the input apparatus is located within a predetermined range of distance from a screen of the first user terminal device, may display the first user interface on a screen, and the second user terminal device, in response to a control signal being received while the input apparatus is located within a predetermined range of distance from a screen of the second user terminal device, may display the second user interface on a screen.

The first user interface may include a menu for transmitting the selected content to an external device in the first user terminal device, and the second user interface may include a menu for receiving the selected content from an external device in the second user terminal device.

The first user terminal device, in response to a menu for transmitting the selected content to an external device being selected in the first user interface, may transmit information about identifier information and an encryption key of the first user terminal device to the input apparatus, and the second user terminal device, in response to a menu for receiving the selected content from an external device being selected in the second user interface, may receive the information about the identifier information and the encryption key of the first user terminal device from the input apparatus.

The first user terminal device, in response to an input of a predetermined pattern is being detected on the screen of the first user terminal device through the input device, may create the encryption key.

A controlling method of an input apparatus capable of receiving an input according to an exemplary of embodiment, in response to content being selected from the first user terminal through the input apparatus and the first predetermined event occurring, includes receiving information about identifier information and an encryption key of the first user terminal device from the first user terminal device and, in response to the second predetermined event occurring, transmitting the received information about the identifier information and the encryption key of the first terminal device to the second user terminal device.

The first predetermined event may include an event where a function of transmitting the selected content to an external device is performed in the first user terminal device through the input apparatus, and the second predetermined event may include an event where a function of receiving the selected content from an external device is performed in the second user terminal device through the input apparatus.

The controlling method of the input apparatus capable of receiving an input according to an exemplary of embodiment, in response to the function key equipped with the input apparatus being pressed upon user manipulation while the input apparatus is located within a predetermined range of distance from a screen of the first user terminal device, may include transmitting a control signal for displaying the first user interface on a screen of the first user terminal device to the first user terminal device and, in response to the function key equipped with the input apparatus being pressed upon user manipulation while the input apparatus is located within a predetermined range of distance from a screen of the second user terminal device, transmitting a control signal for displaying the second user interface on a screen of the second user terminal device to the second user terminal device.

The first user interface may include a menu for transmitting the selected content to an external device in the first user terminal device, and the second user interface may include a menu for receiving the selected content from an external device in the second user terminal device.

Receiving the information from the first user terminal device, in response to a menu for transmitting the selected content to an external device being selected in the first user interface, may receive information about identifier information and an encryption key of the first user terminal device from the first user terminal device, and transmitting the information to the second user terminal device, in response to a menu for receiving the selected content from an external device being selected in the second user interface, may transmit the received information about the identifier information and the encryption key of the first user terminal device to the second user terminal device.

The controlling method of the input apparatus capable of receiving an input according to an exemplary of embodiment may further include storing information about identifier information and an encryption key of the first user terminal device received from the first user terminal device.

The encryption key may be used for encrypting the identifier information of the second user terminal device.

According to various exemplary embodiments, user convenience may be increased since the exemplary embodiment reinforces security and conveniently transmits data to an external device without using a separate external storing device.

DETAILED DESCRIPTION OF EXEMPLARY EMBODIMENTS

Hereinafter, exemplary embodiments will be described in more detail with reference to the accompanying drawings. Further, in the following description, if the exemplary embodiments of features or elements with unnecessary detail would obscure the exemplary embodiments, the detailed description thereof will not be described in detail. Further, the terms used in the following description are the terms defined after considering features of the exemplary embodiment, and therefore, the definition thereof shall be made based on the exemplary embodiment overall.

Figure 1:
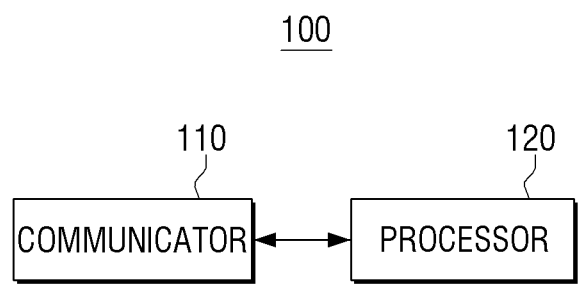
FIG. 1 is a block diagram illustrating a configuration of the input apparatus according to an exemplary embodiment.

FIG. 1 is a block diagram illustrating a configuration of the input apparatus according to an exemplary embodiment.

With a reference to FIG. 1, an input apparatus 100 includes a communicator 110 and a processor 120. The input apparatus 100 is an input apparatus capable of receiving an input, and it may perform an input function, for example, while a screen of a user terminal device is touched by the input apparatus 100 by being contacted therewith. The input apparatus 100 may be embodied in a form of a pen but not limited thereto and may be embodied in various forms of a device. A detailed description of an exemplary method of receiving an input by the input apparatus 100 will be disclosed thereinafter.

When the first user terminal device does not include a feature like a panel capable of receiving an input by touch, the input may be received by transmitting and receiving a control signal between the input apparatus 100 and the first user terminal device. In other words, an input of the input apparatus 100 is not limited to the touch input but may include a case where the input is received by transmitting and receiving a control signal.

Although the first user terminal device may receive an input by a touch input, it may receive an input by receiving a control signal, and therefore, the exemplary embodiment may be applied to the first user terminal device which is not equipped with a touch panel and a display.

An example that the input apparatus 100 is embodied in a form of a pen is described.

The communicator 110 may communicate with the first user terminal device and the second user terminal device. The communicator 110 may communicate with an external device according to various types of communication methods. The communicator 110 may communicate with the first user terminal device and the second user terminal device through various communication methods such as Bluetooth (BT), Wireless Fidelity (W-Fi), Zigbee, Infrared (IR), Serial Interface, Universal Serial Bus (USB), Neal Field Communication (NFC), and the like.

The first user terminal device and the second user terminal device may be embodied in various forms of electronic devices such as a TV, an electronic bulletin board, a Large Format Display (LFD), a smart phone, a tablet, a desktop PC, a laptop, an Electrophoretic Display (EPD), E-PAPER, and the like, may include a touch panel capable of receiving an input, and may be embodied in a form which is not equipped with a touch panel or a display.

The processor 120, in response to content being selected from the first user terminal device through the input apparatus and the first predetermined event occurring, may receive information about identifier information and an encryption key of the first user terminal device from the first user terminal device.

The processor 120, in response to content displayed on a screen of the first user terminal device being selected while a part of the input apparatus 100 is contacted with the screen of the first user terminal device and the first predetermined event occurring, may receive information about identifier information and an encryption key of the first user terminal device through the communicator 110 from the first user terminal device.

A method of selecting a content displayed on the screen of the first user terminal device while the input apparatus 100 is contacted with the screen of the first user terminal device may include at least one of the method that selects content displayed on the screen of the first user terminal device in a way of dragging the content while a part of input apparatus 100 is contacted with the screen of the first user terminal device, that selects a content displayed on the screen of the first user terminal device through one momentary contact of a part of the input apparatus 100 with the screen of the first user terminal, in other words, a single input, and that selects content displayed on the screen of the first user terminal device in a way that a part of the input apparatus 100 transmits a predetermined control signal within a predetermined range of distance from the screen of the first user terminal device.

In a case where the first user terminal device does not include a touch panel or a display which includes a touch detection area capable of detecting a contact with the input apparatus 100, content may be selected from the first user terminal device by transmitting and receiving a control signal between the input apparatus 100 and the first user terminal device.

The input apparatus 100 may be embodied in a form of a pen, but a part of the input apparatus 100 that contacts with a screen of the first user terminal device may be embodied in a pen-tip. In other words, the pen-tip may be defined as a part which directly contacts with the screen of the first user terminal device and draws a line.

The processor 120, in response to the first predetermined event occurring, may receive information about identifier information and an encryption key of the first user terminal device. The identifier information of the first user terminal device may be embodied in Mac address, and the encryption key may be an encryption key that is used only during one communication session between those in communication, and the encryption key may be used to encrypt the identifier information of the second user terminal device which will be described in detail thereinafter.

The foregoing description is based on an example of a case where the processor 120 receives information of identifier information and an encryption key of the first user terminal device from the first user terminal device, but the processor 120 may not only receive the information about the identifier information and encryption key of the first user terminal device from the first user terminal device but also receive information about the storage location of the selected content and transmit it to the second user terminal device.

The information about the storage location of the selected content may indicate a link address of the selected content and may include information about the location in which the selected content is located within the first user terminal device.

In other words, the processor 120, in response to the first predetermined event occurring, may receive the information about the storage location of the selected content from the first user terminal device rather than the selected content per se.

The processor 120, in response to the second predetermined event occurring, may transmit information about identifier information and an encryption key of the first user terminal device received from the first user terminal device to the second user terminal device.

The processor 120, in response to the second predetermined event occurring, may transmit the information about the identifier information and the encryption key of the first user terminal device stored in the storage (not illustrated) to the second user terminal device through the communicator 110.

The identifier information of the first user terminal device may be embodied in a Mac address, and the encryption key may be an encryption key that is used only during one communication session between those in communication, and the encryption key may be used to encrypt identifier information of the second user terminal device.

The processor 120, in response to the second predetermined event occurring, may transmit only information about identifier information and an encryption key of the first user terminal device but may also transmit the storage information of the selected content along with the information, and the storage information of the selected content may be a link address of the selected content, and the first user terminal device may include information about the location in which the selected content is located within the first user terminal device.

The first predetermined event may include an event where a function of transmitting the selected content to an external device is performed in the first user terminal device through the input apparatus, and the second predetermined event may include an event where a function of receiving the selected content from an external device is performed in the second user terminal device through the input apparatus.

The first predetermined event may include a case where a function of transmitting content to an external device is performed in the first user terminal device through the input apparatus 100. For example, the first determined event may include a case where a function of transmitting content is selected in response to an input being received through the input apparatus 100 while a menu of a plurality of functions is being displayed on a screen of the first user terminal device.

The second predetermined event, through an input by the input apparatus 100 in the second user terminal device, may include a function of receiving content from an external device is performed. For example, the second predetermined event may include a case where a function of receiving content is selected in response to an input being received through the input apparatus 100 while a menu of a plurality of functions is being displayed on a screen of the second user terminal device.

In other words, when a pen-tip of the input apparatus 100 selects content on a screen of the first user terminal device and selects a function of transmitting the content on the screen of the first user terminal device, the processor 120 may receive information about identifier information and an encryption key of the first user terminal device from the first user terminal device, and then, when the pen-tip of the input apparatus 100 selects a function of receiving content on a screen of the second user terminal device through input, the processor 120 may transmit the information about the identifier information and the encryption key of the first user terminal device to the second user terminal device.

Figure 2:
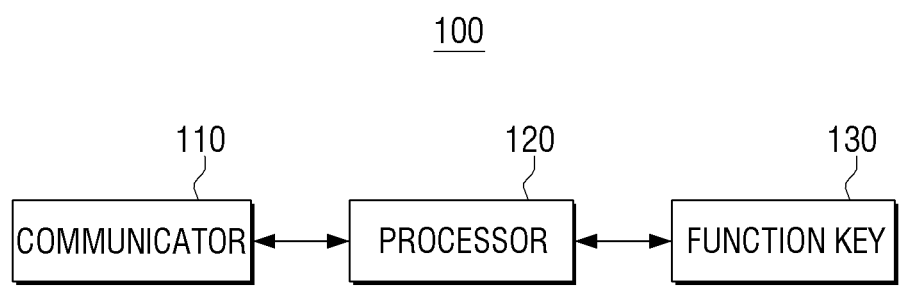
FIG. 2 is a block diagram illustrating a configuration of the input apparatus according to an exemplary embodiment.

FIG. 2 is a block diagram illustrating a configuration of the input apparatus according to another exemplary embodiment.

Referring to FIG. 2, the input apparatus 100 may include a communicator 110, a processor 120, and a user interface e.g., function key 130. A detailed description of the communicator 110 and the processor 120 are set forth herein.

The function key 130 may receive an input upon a user manipulation. For example, the function key 130 may be embodied in a function key with a touch sensor capable of recognizing user's touch, a physical key that can be pressed upon user manipulation, or a function key capable of fingerprint verification.

The processor 120, in response to the function key being pressed upon user manipulation while the input apparatus 100 is located within a predetermined range of distance from a screen of the first user terminal device, may transmit a control signal for displaying the first user interface on the screen of the first user terminal device to the first user terminal device and, in response to the function key being pressed upon the user manipulation while the input apparatus 100 is located within a predetermined range of distance from a screen of the second user terminal device, may transmit a control signal for displaying the second user interface on the screen of the second user terminal device to the second user terminal device.

For example, the processor 120, in response to the function key 130 being pressed while a pen-tip of the input apparatus 100 is located upward and within a predetermined range of distance from the screen of the first user terminal device, may transmit a control signal for displaying the first user interface on the screen of the first user terminal device, and accordingly, the first user terminal device may display the first user interface on the screen.

The processor 120, in response to the function key 130 being pressed while a pen-tip of the input apparatus 100 is located upward and within a predetermined range of distance from a screen of the second user terminal device, may transmit a control signal for displaying the second user interface on the screen of the second user terminal device, and accordingly, the second user terminal device may display the first user interface on the screen.

A process of displaying the first user interface and the second user interface is described hereinafter with reference to FIG. 3A to FIG. 5 while a method that the input apparatus in a form of a pen inputs on the screen of the user terminal device.

Figure 3A:
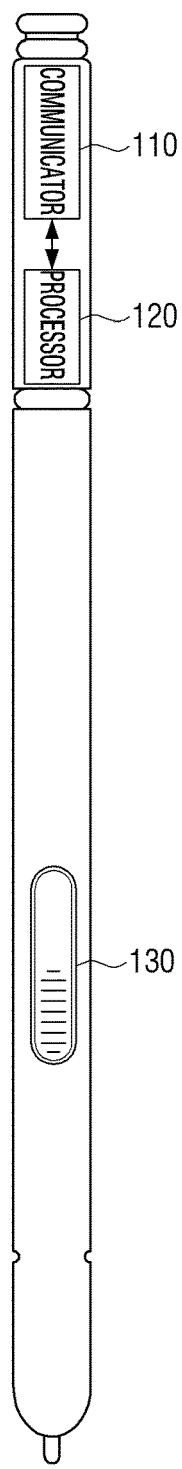
FIG. 3A is a view illustrating the input apparatus in a form of a pen according to an exemplary embodiment.

FIG. 3A is a view illustrating the input apparatus in a form of a pen according to an exemplary embodiment.

Referring to FIG. 3A, the input apparatus 100 is embodied in a form of a pen, and the first area of the pen includes the communicator 110 and the processor 120, and the second area of the pen is equipped with the function key 130, and the pen-tip may be defined as the part stuck out of the bottom end of the pen.

The communicator 110 and the processor 120 may be embodied as hardware in a Bluetooth Low Energy (BLE) circuit, and the BLE circuit may perform functions of communication and interfacing between a pen and a user terminal device, and although it is not illustrated in the drawing, it may further include a storage (not illustrated), which is configured to store information about identifier information and an encryption key of a user terminal device.

The function key 130, in FIG. 3A, is embodied in a form of a physical button that may be pressed upon user manipulation, and accordingly, when a user presses the function key 130 while the input apparatus 100 is located within a predetermined range of distance from a screen of a user terminal device, the processor 120 transmits a control signal to the user terminal device to display a user interface on the screen of the user terminal device.

The input apparatus 100 in a form of a pen illustrated in FIG. 3A is a mere example and may c be embodied in various forms of input apparatus.

Figure 3B:
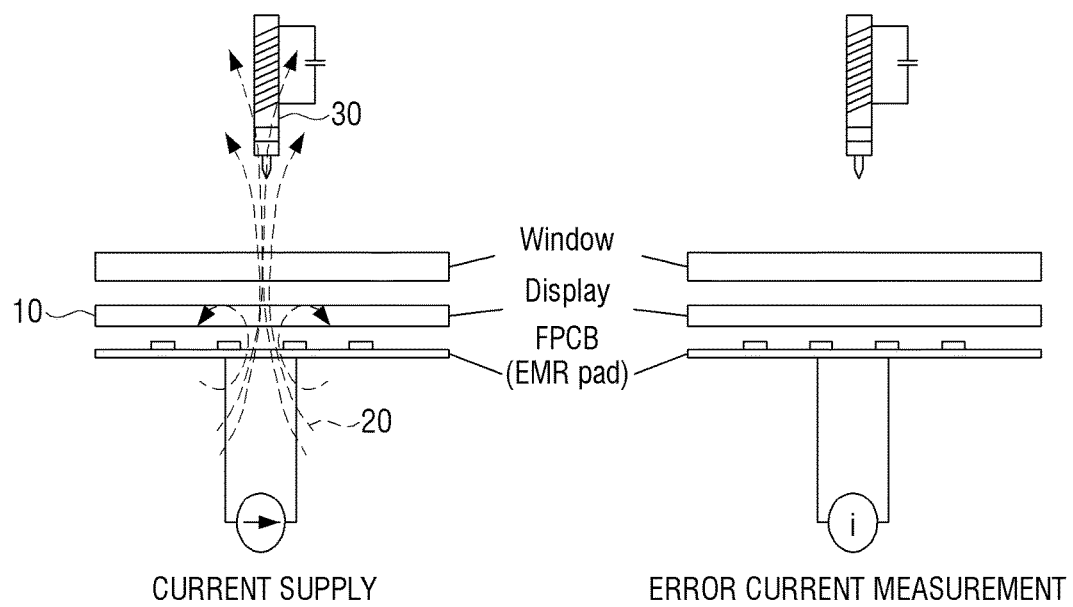
FIG. 3B is a view describing an operation principle of the input apparatus in a form of a pen according to an exemplary embodiment.

FIG. 3B is a view illustrating an operation principle of the input apparatus in a form of a pen according to an exemplary embodiment.

Referring to FIG. 3B, the pen-tip 30 of the input apparatus 100 includes a resonance circuit, and the sensor board 10 of the user terminal device includes a window, a display, and a Flexible PCB (FPCB).

When the electric current is supplied to the sensor board 10, FPCB generates the EM field 20, and energy is delivered to the resonance circuit included in the pen-tip 30 of the input apparatus 100 through the generated EM field 20.

When the electric current supplied to the sensor board 10 is blocked, an induced current measuring instrument connected to the sensor board may measure the induced current arisen from resonance remained in the resonance circuit of the pen-tip 30 of the input apparatus 100 and accordingly, by scanning for each location on the sensor board window, may determine the location of the input apparatus 100 based on signal strength differences arisen from the induced current.

Figure 4:
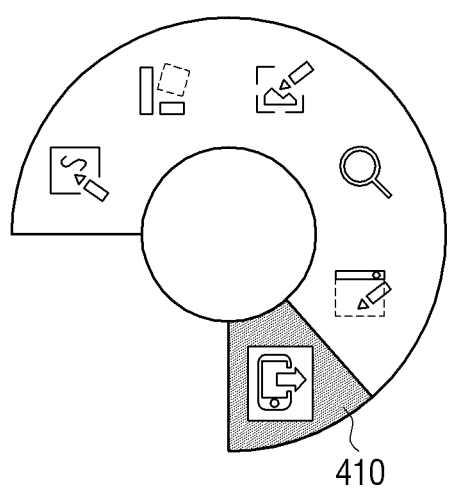
FIG. 4 and FIG. 5 are views illustrating the first user interface and the second user interface according to an exemplary embodiment.
Figure 5:
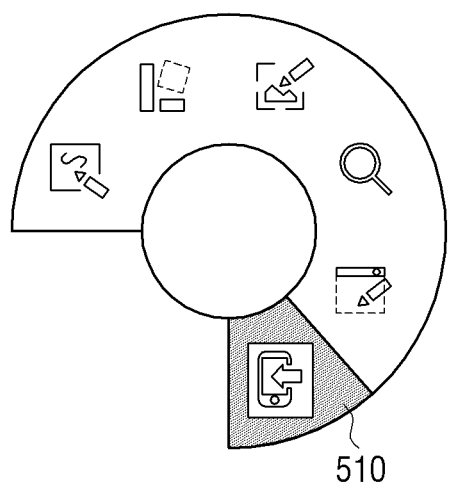

FIG. 4 and FIG. 5 are views illustrating a first user interface and a second user interface according to an exemplary embodiment.

The first user interface may include a menu for transmitting the selected content to an external device in the first user terminal device, and the second user interface may include a menu for receiving the selected content from an external device in the second user terminal device.

Referring to FIG. 4, the first user interface 400 may be displayed on a screen of the first user terminal device, and when a control signal is transmitted to the first user terminal device in response to the function key being pressed upon user manipulation while the input apparatus 100 is located within a predetermined range of distance from the screen of the first user terminal device, the first user interface 400 may be displayed on the screen of the first user terminal device.

The first user interface 400 may include a menu for performing various functions such as pen inputting, editing, copying, searching, and the like, and may include a menu 410 for performing a function to transmit the selected content to an external device.

Referring to FIG. 5, the second user interface 500 may be displayed on the screen of the second user terminal device, and as described above, when a control signal is transmitted to the second user terminal device in respond to the function key being pressed upon user manipulation while the input apparatus 100 is located within a predetermined range of distance from the screen of the second user terminal device, the second user interface 500 may be displayed on the screen of the first user terminal device.

The second user interface 500 may include a menu for performing various functions such as pen inputting, editing, copying, searching, and the like, and may include a menu 510 for performing a function to receive the selected content to an external device.

The first user interface 400 and the second user interface 500 illustrated in the FIGS. 4 and 5 are merely examples and may be embodied in various forms of a user interface.

The processor 120, in response to a menu for transmitting the selected content to an external device being selected in the first user interface, may receive information about identifier information and an encryption key of the first user terminal device from the first user terminal device, and in response to a menu for receiving the selected content from an external device being selected in the second user interface, may transmit the received information about the identifier information and the encryption key of the first user terminal device to the second user terminal device.

For example, the processor 120, in response to a menu 410 for performing a function of transmitting the selected content to an external device being selected in the first user interface 400 through the input apparatus 100, may receive information about identifier information and an encryption key of the first user terminal device from the first user terminal device.

The processor 120, in response to a menu 510 for performing a function of receiving the selected content from an external device being selected in the second user interface 500 through the input apparatus 100, may transmit information about identifier information and an encryption key of the first user terminal device to the second user terminal device.

Figure 6:
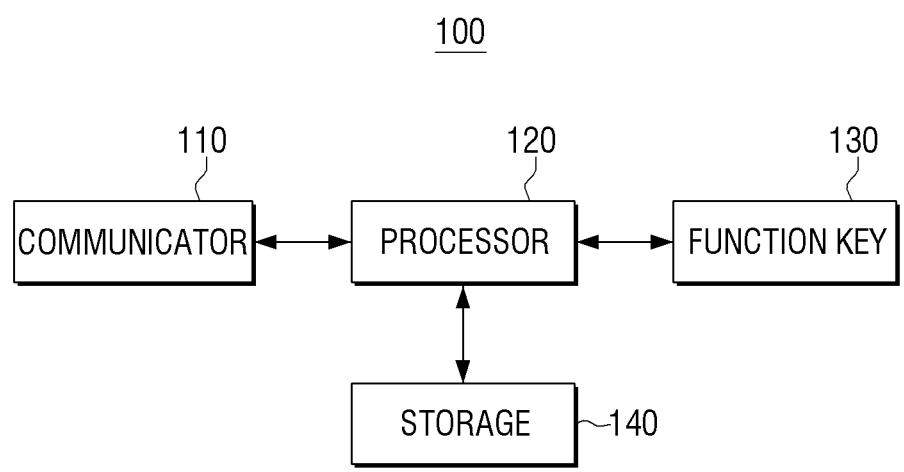
FIG. 6 is a block diagram illustrating a configuration of the input apparatus according to an exemplary embodiment.

FIG. 6 is a block diagram illustrating a configuration of the input apparatus according to another exemplary embodiment.

Referring to FIG. 6, the input apparatus 100 may include the communicator 110, the processor 120, the function key 130, and the storage 140. Detailed descriptions of the communicator 100, the processor 120, and the function key 130 are provided above.

The storage 140 may include a ROM (not illustrated), a RAM (not illustrated), and the like, and a set of commands for system rebooting may be stored in the ROM (not illustrated), and various kinds of application programs may be copied into the RAM (not illustrated).

The processor 120 may store the information about the identifier information and the encryption key of the first user terminal device received from the first user terminal device in the storage 140.

In other words, while the processor 120 stores the information about the identifier information and the encryption key of the first user terminal device received from the first user terminal device in the storage 140, and the input apparatus 100 is located on the screen of the second user terminal device, in response to the second predetermined event occurring, the processor 120 may transmit the information about the identifier information and the encryption key of the first user terminal device to the second user terminal device.

The encryption key may be used to encrypt the identifier information of the second user terminal device, and in this regard, a system that includes the first user terminal device, the second user terminal device, and input apparatus 100 will be described hereinafter.

Figure 7:
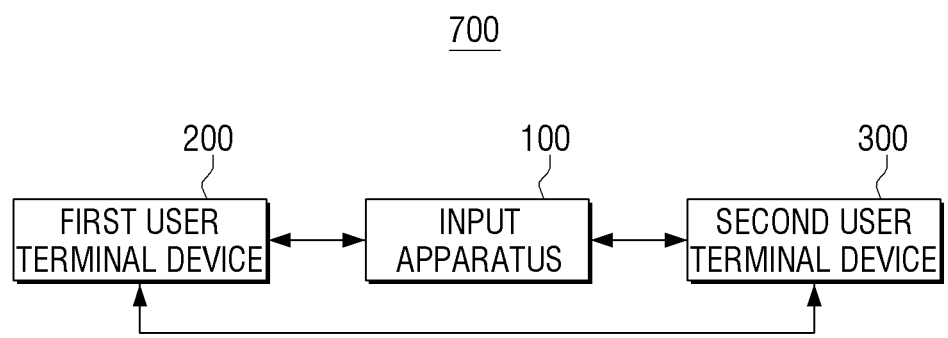
FIG. 7 is a block diagram illustrating a configuration of the system which includes the input apparatus, the first user terminal device, and the second user terminal device according to an exemplary embodiment.

FIG. 7 is a block diagram illustrating a configuration of the system which includes the input apparatus, the first user terminal device, and the second user terminal device according to an exemplary embodiment.

Referring to FIG. 7, the system 700 may include the input apparatus 100, the first user terminal device 200, and the second user terminal device 300.

The input apparatus 100 is an input apparatus capable of receiving an input, and the input apparatus, in response to a content being selected in the first user terminal device 200 through the input apparatus and the first predetermined event occurring, may receive information about identifier information and an encryption key of the first user terminal device 200 from the first user terminal device 200, and, in response to the second predetermined event occurring, may transmit the received information about the identifier information and the encryption key of the first user terminal device 200 to the second user terminal device 300.

The second user terminal device 300, based on the received encryption key, may encrypt the identifier information of the second user terminal device 300 and may transmit the identifier information of the second user terminal device 300 to the first user terminal device 200.

The second user terminal device 300, in response to the information being received about the identifier information and the encryption key of the first user terminal device 200, may encrypt the identifier information of the second user terminal device 300 based on the received encryption key and may transmit the encrypted identifier information of the second user terminal device 300 to the first user terminal device 200.

The second user terminal device 300 may directly transmit the encrypted identifier information of the second user terminal device 300 but also may transmit in a form of a broad casting.

The second user terminal device 300, may transmit not only the encrypted identifier information of the second user terminal device 300 but also the identifier information of the first user terminal device 200, and here, when transmitting in a form of broad casting, the first user terminal device 200 may determine whether the information transmitted thereto is correct based on the encrypted identifier information of the second user terminal device 300 and the identifier information of the first user terminal device 200.

The first terminal device 200 may decrypt the encrypted identifier information of the second user terminal device based on the encryption key, and may transmit the selected content to the second user terminal device based on the decrypted identifier information of the second user terminal device.

In other words, the first user terminal device 200 may receive identifier information of the first user terminal device 200 and the encrypted identifier information of the second user terminal device 300 from the second user terminal device 300 and, after checking whether the information is received properly by checking the identifier information of the first user terminal device 200, may decrypt the identifier information of the second user terminal device 300 based on the encryption key.

Further, the first user terminal device 200 may communicate with the second user terminal device 300 based on the encrypted identifier information of the second user terminal device 300.

Upon the first user terminal device 200 and the second user terminal device 300 being connected, the first user terminal device 200 may transmit the selected content to the second user terminal device 300 based on information about the storage location of the selected content.

The first predetermined event may include an event where a function of transmitting the selected content to an external device is performed in the first user terminal device 200 through an input, and the second predetermined event may include an event where a function of receiving the selected content from an external device is performed in the second user terminal device 300 through an input.

The first predetermined event may include an event where a function of transmitting content to an external device is performed on a screen of the first user terminal device 200 through input apparatus 100. For example, the first predetermined event may include an event where the input apparatus 100 receives an input and a function of transmitting content is selected while a menu with a plurality of functions are displayed on the screen of the first user terminal device 200.

The second predetermined event may include an event where a function of receiving content from an external device is performed on a screen of the second user terminal device 300 through input apparatus 100. For example, the second predetermined event may include an event where the input apparatus 100 receives an input and a function of receiving content is selected while a menu with a plurality of functions are displayed on the screen of the second user terminal device 300.

The first user terminal device 200, in response to a control signal being received while the input apparatus 100 is located within the predetermined range of distance from the first user terminal device 200, may display the first user interface on a screen, and the second user terminal device 300, in response to a control signal being received while the input apparatus 100 is located within the predetermined range of distance from the second user terminal device 300, may display the second user interface on a screen.

The first user interface may include a menu for transmitting the selected content to the external device in the first user terminal device 200, and the second user interface may include a menu for receiving the selected content from the external device in the second user terminal device 300.

The first user terminal device 200, in response to a menu for transmitting the selected content to an external device being selected in the first user interface, may transmit information about identifier information and an encryption key of the first user terminal device 200 to the input apparatus 100, and the second user terminal device 300, in response to a menu for receiving the selected content from an external device being selected in the second user interface, may receive the information about the identifier information and the encryption key of the first user terminal device 200 from the input apparatus 100.

The process of displaying the first user interface and the second user interface and features of the first user interface and the second user interface are as described above in FIG. 3A and FIG. 5.

Figure 8:
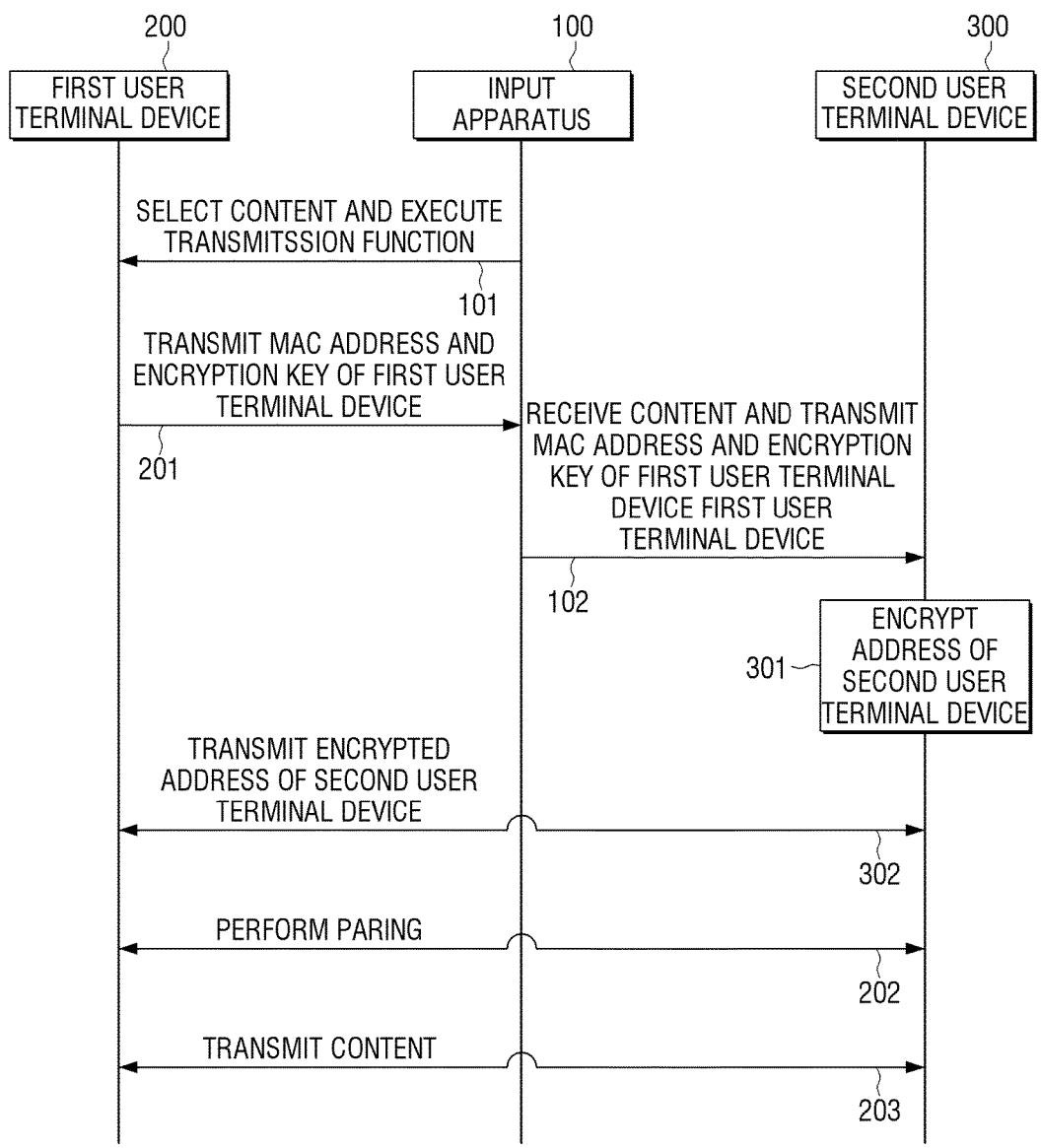
FIG. 8 is a timing chart describing an operation process of the system according to an exemplary embodiment.

FIG. 8 is a timing chart describing an operation process of the system according to an exemplary embodiment.

Referring to FIG. 8, when the input apparatus 100 selects content 101 in the first user terminal device 200 through an input, transmits a control signal 101 for displaying the first user interface to the first user terminal device 200, and selects a menu 101 for performing a function of transmitting the content from the first user interface which is displayed on a screen of the first user terminal device 200, the first user terminal device 200 may transmit information 201 about a Mac address and an encryption key of the first user terminal device 200 to the input apparatus 100.

Further, when the input apparatus 100 transmits a control signal 102 for displaying the second user interface to the second user terminal device 300, selects a menu 102 for performing a function of receiving the content from the second user interface which is displayed on a screen of the second user terminal device 300, and transmits the information 102 about the Mac address and the encryption key of the first user terminal device 200 to the second user terminal device 300, the second user terminal device 300 may encrypt the Mac address 301 of the second user terminal device 300 based on the received encryption key and may transmit 302 the encrypted Mac address of the second user terminal device 300 to the first user terminal device 200 along with the Mac address of the first user terminal device 200.

The first user terminal device 200 may decrypt the Mac address of the second user terminal device 300 received from the second user terminal device 300 and pairs up with the second user terminal device 300.

Once paring between the first user terminal device 200 and the second user terminal device 300 is completed, the first user terminal device 200 may transmit the selected content to the second user terminal device 300.

Figure 9:
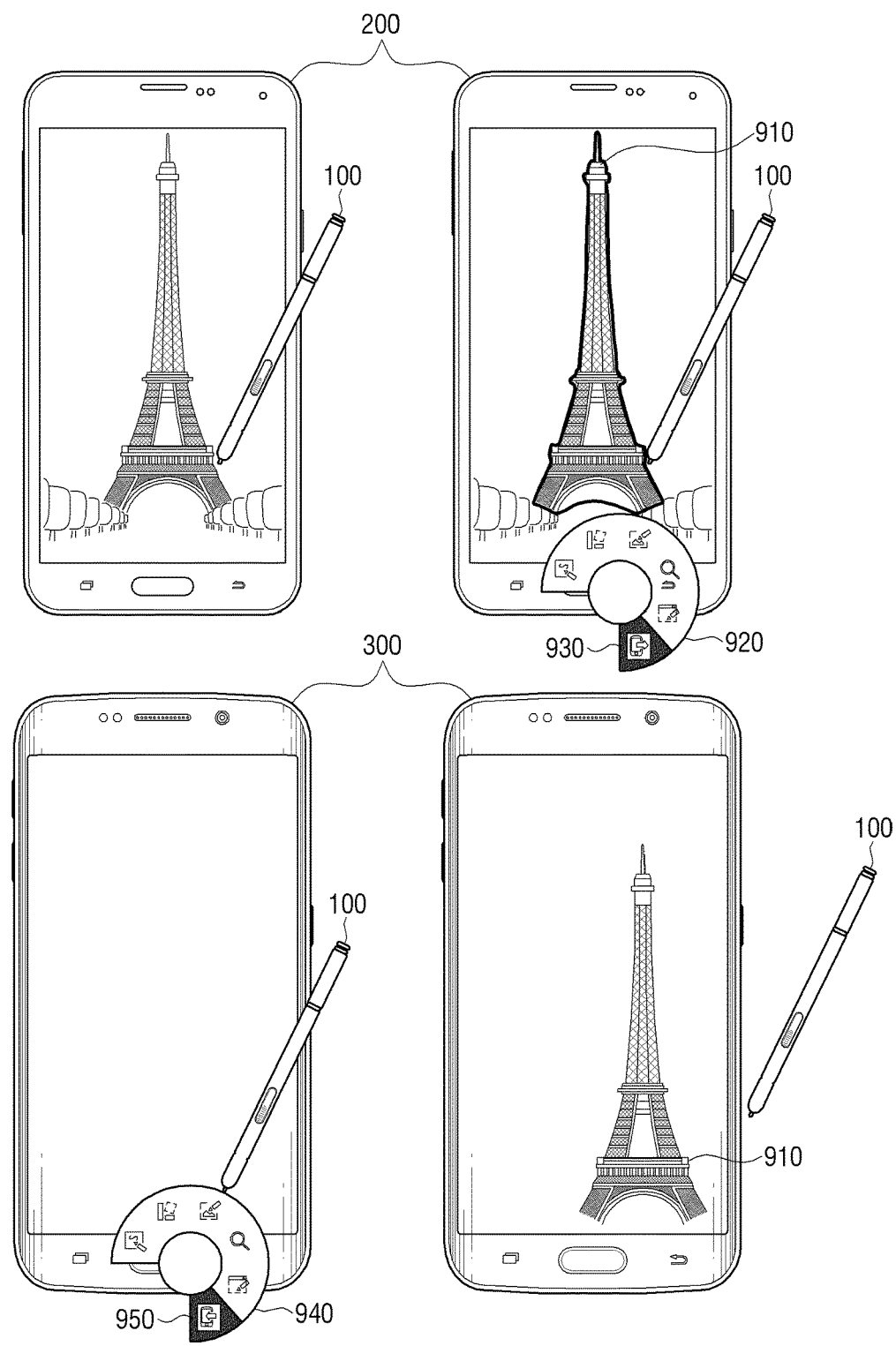
FIG. 9 is a view showing transmitting content according to an exemplary embodiment.

FIG. 9 is a view showing transmitting content according to an exemplary embodiment.

Referring to FIG. 9, after an object 910 in an image displayed on a screen of the first user terminal device 200 is selected by the input apparatus 100, the first user interface 920 may be displayed on the screen of the first user terminal device 200, and a menu 930 may be selected for performing a function for transmitting on the first user interface 920 through the input apparatus 100.

Further, the second user interface 940 may be displayed on the screen of the second user terminal device 300 by the input apparatus 100, and in response to a menu 950 on the second user interface 940 being selected for performing a function for receiving through the input apparatus 100, the object 910 selected through the input apparatus 100 may be displayed on the screen of the second user terminal device 300.

The input apparatus 100 may receive information about identifier information and an encryption key of the first user terminal device 200 from the first user terminal device 200 and may transmit them to the second user terminal device 300, and after the second user terminal device 300 encrypts the identifier information of the second user terminal device 300 based on the received encryption key and transmits the information to the first user terminal device 200, the first user terminal device 200 may transmit the selected object 910 to the second user terminal device 300 and the operation of the processor 120 may be applied identically.

The first user terminal device 200 may generate an encryption key when a predetermined pattern of input is detected through the input apparatus 100 on the screen of the first user terminal device 200.

For example, if a user inputs a pattern through the input apparatus 100 on the screen of the first user terminal device 200, the first user terminal device 200 may generate an encryption key based on the predetermined input pattern.

If a user inputs the predetermined pattern through the input apparatus 100 on the screen of the second user terminal device 300, the input apparatus 100 may transmit information about identifier information and an encryption key of the first user terminal device 200 to the second user terminal device 300.

In a case, for example, where a user signs electronically with the input apparatus 100, the electronic signature may be corresponded to a predetermined input pattern, and accordingly, every time the user signs electronically through the input apparatus 100, the first user terminal device 200 may generate an encryption key.

Further, for example, in a case where a user signs electronically with the input apparatus 100 for the second user terminal device 300, the input apparatus 100 may transmit the encryption key generated from the first user terminal device 200 and the identifier information of the first user terminal device 200 to the second user terminal device 300, and accordingly, an electronic approval may be performed while the first user terminal device 200 and the second user terminal device 300 are linked with each other.

Accordingly, a data transmission process between the processor 120 and the input apparatus 100, the first user terminal device 200, and the second user terminal device 300 may be applied to an exemplary embodiment where an electronic approval is performed when signed electronically.

Content may include various types of files, and the file may include music, picture, text, video, document, and the like.

Figure 10:
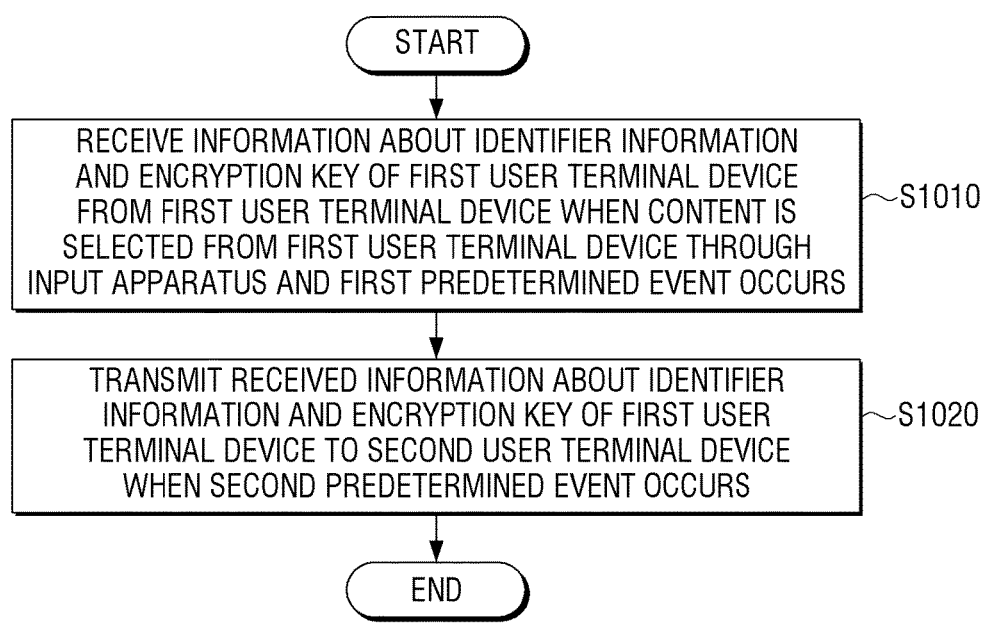
FIG. 10 is a flow chart describing a controlling method of the input apparatus capable of receiving an input according to an exemplary embodiment.

FIG. 10 is a flow chart illustrating a controlling method of the input apparatus capable of receiving an input according to an exemplary embodiment.

The controlling method of the input apparatus capable of receiving an input, in response to content being selected from the first user terminal device through the input apparatus and a first predetermined event occurring, includes receiving information about identifier information and an encryption key of the first user terminal device from the first user terminal device S1010.

Further, in response to the second predetermined event occurring, the controlling method includes transmitting the received information about the identifier information and the encryption key of the first terminal device to the second user terminal device S1020.

The first predetermined event includes an event where a function of transmitting the selected content to an external device is performed in the first user terminal device through the input apparatus, and the second predetermined event includes an event where a function of receiving the selected content from an external device is performed in the second user terminal device through the input apparatus.

On the other hand, the controlling method of the input apparatus capable of receiving an input according to an exemplary embodiment, in response to the function key equipped with the input apparatus being pressed upon user manipulation while the input apparatus is located within a predetermined range of distance from a screen of the first user terminal device, includes transmitting a control signal to the first user terminal device for displaying the first user interface on the screen of the first user terminal device and, in response to the function key equipped with the input apparatus being pressed upon the user manipulation while the input apparatus is located within a predetermined range of distance from a screen of the second user terminal device, transmitting a control signal to the second user terminal device for displaying the second user interface on the screen of the second user terminal device.

The first user interface includes a menu for transmitting the selected content to an external device in the first user terminal device, and the second user interface includes a menu for receiving the selected content from an external device in the second user terminal device.

Receiving the information from the first user terminal device, in response to a menu for transmitting the selected content to an external device being selected in the first user interface, may receive information about identifier information and an encryption key of the first user terminal device from the first user terminal device, and transmitting the information to the second user terminal device, in response to a menu for receiving the selected content from an external device being selected in the second user interface, may transmit the information about the identifier information and the encryption key of the first user terminal device to the second user terminal device The controlling method of the input apparatus capable of receiving an input according to an exemplary embodiment may further include storing information about identifier information and an encryption key of the first user terminal device received from the first user terminal device The encryption key may be used for encrypting identifier information of the second user terminal device.

The controlling method of the input apparatus capable of receiving an input according to an exemplary embodiment may be embodied in a program code executable by a computer and stored in a various non-transitory computer readable medium, and then, may be provided to each device as to be performed by the controller.

For an exemplary embodiment, in response to content being selected in the first user terminal device through the input apparatus and the first predetermined event occurring, a non-transitory computer readable medium storing a program that performs the controlling method which includes receiving information about identifier information and an encryption key of the first user terminal device from the first user terminal device and transmitting the information about the identifier information and the encryption key of the first user terminal device to the second user terminal device may be provided.

The non-transitory computer readable medium is not a medium that stores data for a short period of time like a register, cache memory, and the like but may be defined as a medium that stores data semi-permanently and that is readable by a device. Various applications or programs may be stored in and provided through a non-transitory computer readable medium such as a CD, a DVD, a hard disk, a blue-ray disc, a USB, a memory card, a ROM, and the like.

The block diagram illustrating the input apparatus capable of receiving an input does not show a bus, but each component of the input apparatus capable of receiving an input may be linked with each other through a bus. Further, each device may further include a controller such as a CPU, a micro controller, and the like, which performs the various processes described above.

Although exemplary embodiments are illustrated and described, the exemplary embodiment shall not be construed as limiting to the foregoing exemplary embodiments, and without departing from the principles and spirit of the scope of which is defined in the appended claims, many alternatives and variations will be apparent to those skilled in the art, and the alternatives and variations shall not be acknowledged independently from the technical idea and prospect of the exemplary embodiment.

What is claimed is:

1. An input apparatus configured to receive an input, the input apparatus comprising:
    a communicator; and
    a hardware processor configured to:
        based on a content of a first user terminal device being selected by the input apparatus and a first predetermined event occurring, control the communicator to receive from the first user terminal device identifier information of the first user terminal device and an encryption key used to encrypt identifier information of a second user terminal device, and
        based on a second predetermined event occurring, control the communicator to transmit the received identifier information of the first user terminal device and the received encryption key to the second user terminal device,
    wherein the first predetermined event includes an event that the first user terminal device transmits the selected content to an external device through the input apparatus.

2. The input apparatus as claimed in claim 1,
    wherein the second predetermined event includes a receiving of the selected content from the external device by the second user terminal device through the input apparatus.

3. The input apparatus as claimed in claim 1, further comprising:
    a function key configured to receive a user manipulation, wherein the hardware processor is further configured to:
        based on the function key receiving the user manipulation while the input apparatus is located within a predetermined range of a distance from a first screen of the first user terminal device, transmit a first control signal to control a first display of a first user interface on the first screen of the first user terminal device to the first user terminal device, and
        based on the function key receiving the user manipulation while the input apparatus is located within a predetermined range of distance from a second screen of the second user terminal device, transmit a second control signal to control a second display of a second user interface on the second screen of the second user terminal device to the second user terminal device.

4. The input apparatus as claimed in claim 3, wherein the first user interface includes a first menu configured to transmit the selected content to the external device in the first user terminal device, and
    wherein the second user interface includes a second menu configured to receive the selected content from the external device in the second user terminal device.

5. The input apparatus as claimed in claim 4, wherein the hardware processor is further configured to:
    based on the first menu being selected in the first user interface, receive the identifier information and the encryption key from the first user terminal device, and
    based on the second menu being selected in the second user interface, transmit the identifier information and the encryption key to the second user terminal device.

6. The input apparatus as claimed in claim 1, further comprising:
    a storage,
    wherein the hardware processor is further configured to store the identifier information of the first user terminal device and the encryption key of received from the first user terminal device in the storage.

7. The input apparatus as claimed in claim 1, wherein the encryption key is usable for encrypting another identifier information of the second user terminal device.

8. A system including:
    an input apparatus configured to receive an input;
    a first user terminal device;
    a second user terminal device,
    the input apparatus configured to:
        based on a content being selected from the first user terminal by the input apparatus and a first predetermined event occurring, receive from the first user terminal device first identifier information of the first user terminal device and an encryption key used to encrypt identifier information of the second user terminal device, and
        based on a second predetermined event occurring, transmit the received first identifier information of the first terminal device and the encryption key to the second user terminal device,
    wherein the second user terminal device, based on the received encryption key, configured to:
        encrypt the second identifier information of the second user terminal device, and
        transmit the encrypted second identifier information of the second user terminal device to the first user terminal device,
    wherein the first user terminal device configured to:
        decrypt the received encrypted second identifier information of the second user terminal device based on the encryption key, and transmit the received selected content to the second user terminal device based on the encrypted second identifier information of the second user terminal device, and wherein the first predetermined event includes an event that the first user terminal device transmits the selected content to an external device through the input apparatus.

9. The system as claimed in claim 8, wherein the second predetermined event includes a receiving of the selected content from the external device by the second user terminal device through the input apparatus.

10. The system as claimed in claim 8, wherein the first user terminal device, in response to a first control signal being received while the input apparatus is located within a predetermined range of distance from a first screen of the first user terminal device, displays a first user interface on the screen, and wherein the second user terminal device, in response to a second control signal being received while the input apparatus is located within a predetermined range of distance from a second screen of the second user terminal device, displays the second user interface on the second screen.

11. The input apparatus as claimed in claim 10, wherein the first user interface includes a first menu configured to transmit the selected content to the external device in the first user terminal device, wherein the second user interface includes a second menu configured to receive the selected content from the external device in the second user terminal device.

12. The system as claimed in claim 11, wherein the first user terminal device, in response to the first menu being selected in the first user interface, transmits the first identifier information and the encryption key to the input apparatus, and wherein the second user terminal device, in response to the second menu being selected in the second user interface, receives the first identifier information and the encryption key from the input apparatus.

13. The system as claimed in claim 8, wherein the first user terminal device, in response to an input of a predetermined pattern being detected on the first screen of the first user terminal device through the input device, creates the encryption key.

14. A controlling method of an input apparatus configured to receive an input, the method comprising:

based on a content being selected from a first user terminal by the input apparatus and a first predetermined event occurring, controlling the input apparatus to receive identifier information of the first user terminal device and an encryption key used to encrypt identifier information of the second user terminal device from a first user terminal device; and based on a second predetermined event occurring, controlling the input apparatus to transmit the received identifier information of the first user terminal device and the encryption key to the second user terminal device, wherein the first predetermined event includes an event that the first user terminal device transmits the selected content to an external device through the input apparatus.

15. The controlling method as claimed in claim 14, wherein the second predetermined event includes an event where a receiving the selected content from the external device is by the second user terminal device through the input apparatus.

16. The controlling method as claimed in claim 14, further comprising:

transmitting a first control signal, in response to a first input by a user while the input apparatus is located within a predetermined range of distance from a first screen of the first user terminal device, and displaying a first user interface on the first screen of the first user terminal device to the first user terminal device; and transmitting a second control signal, in response to a second input by the user while the input apparatus is located within a predetermined range of distance from a second screen of the second user terminal device, and displaying displays a second user interface on the second screen of the second user terminal device.

17. The controlling method claimed in claim 16, wherein the first user interface includes a first menu for transmitting the selected content to the external device in the first user terminal device, and wherein the second user interface includes a second menu for receiving the selected content from the external device in the second user terminal device.

18. The controlling method claimed in claim 17, wherein receiving the information from the first user terminal device, in response to a first menu for transmitting the selected content to an external device being selected in the first user interface, receives the information about the identifier information and the encryption key from the first user terminal device and, wherein transmitting the information to the second user terminal device, in response to a second menu for receiving the selected content from the external device being selected in the second user interface, transmits the received information about the identifier information and the encryption key to the second user terminal device.

19. The controlling method claimed in claim 14, further comprising:

storing the identifier information and the encryption key received from the first user terminal device.

20. The controlling method claimed in claim 14, wherein the information about the encryption key is used for encrypting another identifier information of the second user terminal device.

* * * * *